Patented Mar. 28, 1939

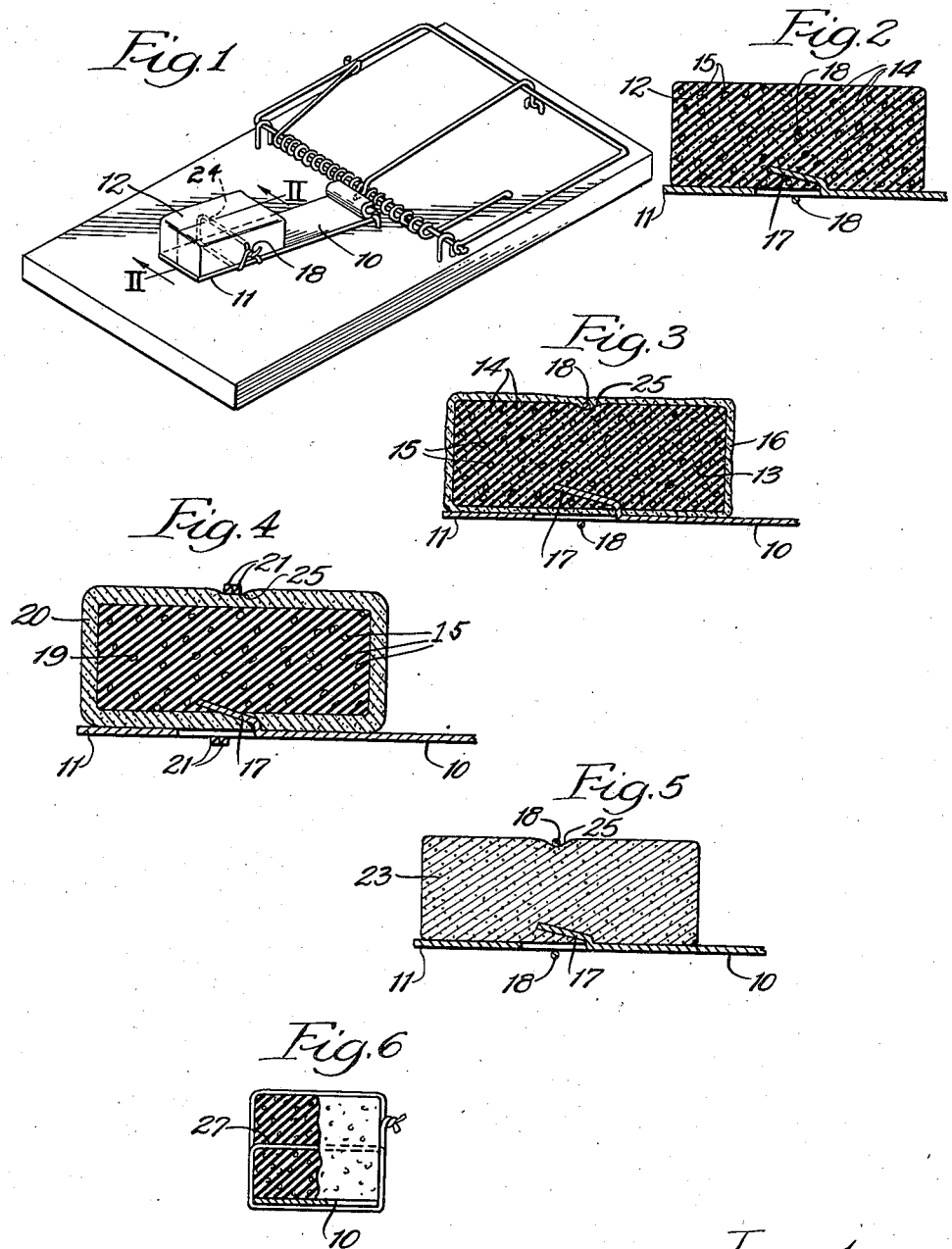

2,152,034

UNITED STATES PATENT OFFICE 2,152,034

BAIT FOR ANIMAL TRAPS

Lawrence H. Fowler, Elmhurst, Ill.

Application July 9, 1937, Serial No. 152,676

4 Claims. (Cl. 99—3)

This invention relates to animal traps and is concerned more particularly with bait for mouse traps of the trip type.

Trip type mouse traps in the past have been rather unsuccessful, not because of the inherent structures themselves, but because the bait employed has been of such character as to be nibbled or filched in whole or in part without the tripping of the traps, enabling the mice to escape and requiring rebaiting after each use.

It is accordingly an object of my invention to provide an improved mouse bait of lasting qualities and of a character which will insure the tripping of the trap in time to catch the mouse.

It is another object to provide mouse bait which has taste attraction and is tenacious and will remain secured to the trap so as to require a tug by the mouse sufficient to operate the trap.

A further object is to provide a bait of such character that an attempt by a mouse to bite off a morsel will result in tripping the trap and catching the mouse.

Another object is to provide a mouse bait which may be reused indefinitely.

It is also an object to provide for such securement of the bait that it will not require readjustment.

It is another object to provide molded bait of cheese or of other animal-attracting refuse.

It is a further object to provide bait of tough spongy material.

Another object is to provide bait which is not frangible or friable.

Further objects and advantages of my invention will appear as the description proceeds.

Certain illustrative embodiments of the invention appear in the accompanying drawing, in which:

Fig. 1 is an isometric view of a mouse trap baited in accordance with one form of the invention.

Fig. 2 is an enlarged sectional view taken as indicated by the line II—II in Fig. 1.

Figs. 3, 4 and 5 are views similar to Fig. 2, but of modified forms of the invention.

Fig. 6 shows another mode of anchoring the bait.

Referring now more particularly to the drawing, a rodent trap is shown in Fig. 1 with the tripper and bait supporting bar 10 carrying at its outer end 11 a piece of bait 12 constructed in accordance with one form of my invention. The piece 12 may be of any suitable shape and formed of art gum 13, sponge or other rubber, or of a flexible leather or other flexible material which is tough, preferably not reduced by chewing, and is preferably of a cellular nature. This piece may be smeared and/or impregnated with any suitable substance attractive to mice and rats, such as a cheese essence 14. The substance or essence penetrates into the vesicles 15 of the cellular material so as to form an intimate and lasting union therewith. Mere impregnation as shown in Fig. 2 is usually sufficient, but I may also add a coat of cheese or other odoriferous material as shown at 16 in Fig. 3.

The piece of bait is preferably hooked onto a prong 17 projecting from the bait holder 10, and a wire 18, rubber band, cord or other strand wrapped about the bait and holder or otherwise associated therewith to securely hold the bait in place. The wrapping element also preferably is smeared with said substance.

A modified bait is shown in Fig. 4 and comprises a core 19 of art gum or any other of the aforesaid substances, about which is molded a shell or coat 20 of refuse, such, for example, as cheese refuse or sweepings ordinarily discarded by a cheese factory. This shell has the cheese aroma attractive to the animals to be trapped. Any other suitable material attractive to such animals may be molded on a core instead of the cheese refuse. It will be observed that in this form a rubber band 21 is employed to tie the bait in place, although other tying means could be used as has been stated.

The bait may be formed entirely of a molded piece of cheese or other refuse, as from a dairy or other food plant, stockyard, etc., as shown at 23 in Fig. 5. This material is tough or may be made so by the addition of a suitable binder or other substance before the molding operation, and will operate similarly to the rubber and other materials above mentioned. In this way, I provide for the utilization of normally waste material. Sweepings from such plants are suitable for use under my invention, since such material includes enough dirt, etc., to serve as a binder, with enough strongly smelling material to attract the animal.

The wire or other strand may penetrate the bait and then secure the bait to the holder as shown at 24 in Fig. 1 or as shown at 27 in Fig. 6.

If desired, the bait may be formed with a groove 25 to accommodate the tying member so as to assist in securely anchoring the piece in place on the holder 10, as shown in Figs. 3, 4 and 5.

With my invention, the mice or other animals are trapped before they have had an opportunity to move or remove any substantial part of the bait. Thus, upon disposing of each trapped animal and resetting the trap, the bait of my invention is ready to be used again without further ado and may be used a great many times or indefinitely.

The bait may be manufactured very cheaply and is of suitable body and strength to lend itself admirably to being securely tied in place without danger of disturbance by the animals to be trapped.

I am aware that numerous changes may be made and details of construction varied through a wide range without departing from the principles of my invention, and I therefore do not purpose limiting the patent granted hereon otherwise than as necessitated by the prior art.

I claim:

1. An animal bait comprising a tenacious, yieldable, shape-retaining body having means for attracting animals and having a groove for receiving an anchoring strand.

2. A bait for an animal trap and having interlocked therewith an elastic strand for securing said bait to the tripping member of a trap.

3. A bait for an animal trap comprising a coherent body gustatorily attractive to animals and having interlocked therewith an elastic strand for securing said body to the tripping member of a trap.

4. An animal bait comprising a tenacious, yieldable, shape-retaining body having means for attracting animals and having a groove for receiving an anchoring strand, and an elastic anchoring strand extending in said groove and fastened to said body for securing said body to the tripping member of an animal trap.

LAWRENCE H. FOWLER.